March 24, 1959 C. H. SMITH 2,879,017
APPARATUS FOR INTERCONNECTING AIRCRAFT IN FLIGHT
Filed Jan. 25, 1955
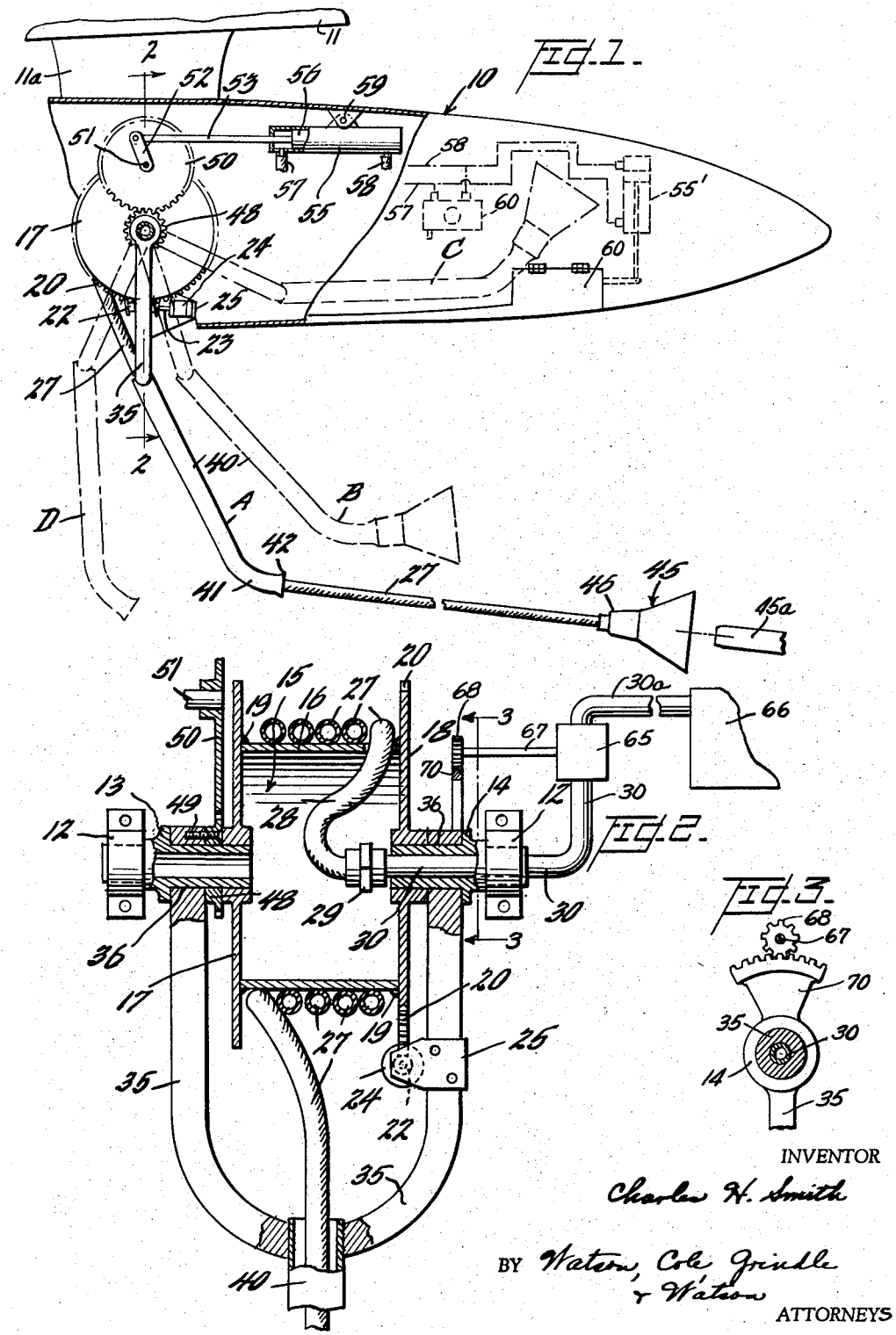
INVENTOR
Charles H. Smith
BY Watson, Cole, Grindle
& Watson
ATTORNEYS

United States Patent Office 2,879,017
Patented Mar. 24, 1959

2,879,017

APPARATUS FOR INTERCONNECTING AIRCRAFT IN FLIGHT

Charles H. Smith, Annapolis, Md., assignor to Flight Refueling Incorporated, Baltimore, Md., a corporation of Delaware Application January 25, 1955, Serial No. 484,037

6 Claims. (Cl. 244—135)

This invention relates to means for interconnecting aircraft in flight, and more particularly to devices for placing a leading aircraft in coupled relation with a following aircraft, for example, for effecting refueling of one of said aircraft from the other in flight.

The general object of the invention is to provide a novel and improved system of flight refueling, with special reference to the installation provided in the leading aircraft, which is usually although not invariably the tanker aircraft.

Prior developments in probe and drogue refueling systems, particularly those covered by patents and applications for patent in which the assignee of the present application has an interest, have included flexible hose installations or direct rigid tubular installations.

An important aim of the present invention is to provide a system which derives the principal advantages of both of these systems.

In its preferred embodiment, the invention contemplates the provision of an installation in a leading aircarft, of a flexible hose carried on a rotary reel or drum, the rotation of which controls the paying out and reeling in of the hose, which hose is threaded through a rigid tubular guide pivotally mounted within the aircraft concentric with the hose reel, the tubular guiding element being controlled to swing from a retracted position within the aircraft to one or more extended or projected positions exteriorly thereof.

The whole arrangement may be installed within a pod or external package of suitable aerodynamic form or within the body of the aircraft in any suitable location such as the bomb bay.

The outer end of the tubular guide may be fashioned into a rather generous fairlead to accommodate the coupling and drogue carried at the end of the hose. When required for use, the tubular guide will be swung out of the pod or package downwardly and forwardly to an angle of say 45° to the vertical. The reel will then be driven by a reversible motor permitting the hose to trail from the tubular guide to its full extent. Contact by the following or receiver aircraft is made in the conventional manner, the hose giving lateral and vertical formating freedom, this allowance in the fore-and-aft direction being provided by the ability of the tube to swing about its pivot. In this case it is necessary to spring-load the tube since the hose cannot take compressive loads.

Among the advantages of the present invention over either of the two known systems per se, may be recited the following:

(a) The provision of a trailing flexible hose in the installation on the leading aircraft, instead of a rigid, or even a jointed tubular conduit member, affords the following aircraft more freedom in overrunning in the forward direction in cases where the limit of take-up provided by a swinging rigid tube or pipe is exceeded.

(b) The possibility of the achievement of better low temperature performance, due to the fact that, although the applicant's system employs a hose which furnishes the critical low temperature feature of the system, the hose may be provided with a metal corrugated lining since, for a predetermined rate of flow, a larger bore of hose may be used which will compensate for the pressure loss inherent in this type of construction.

(c) The stowage problem is greatly eased, since the drogue may be readily stowed under direct control of the angular movement of the guide tube.

(d) The flexibility inherent in the hose system is retained, and it is considered that a greater degree of lateral and vertical movement by the following or receiver aircraft is provided when a flexible hose is used for the horizontal member in the system.

(e) The use of a flexible hose permits the horizontal member in the system to be longer than would be the case if a rigid tube were employed, this giving an advantage in cases where it is not desirable to fly the receiver airplane very close to the tanker.

(f) The forces exerted on the tubular guide member will be less when a hose is used as the horizontal member, since the direction of application of these forces will be more or less in the line of flight instead of at a definite angle at the bottom tubular member which would be the case if a rigid horizontal tube were used.

(g) It is possible that the doors in an external package, embodying the applicant's novel installation, could be smaller than those required to permit passage of the known tubular unit arrangements employing rigid tubes throughout.

Other objects and features of novelty will be apparent from the following specification when read in connection with the accompanying drawings in which one embodiment of the invention is illustrated by way of example.

In the drawings:

Figure 1 is a diagrammatic view partly in side elevation and partly in vertical longitudinal section showing one embodiment of the invention;

Figure 2 is a vertical transverse sectional view taken approximately on line 2—2 of Figure 1; and Figure 3 is a vertical sectional view taken on line 3—3 of Figure 2.

In the embodiment selected for exemplary illustration in the drawings, the reference numeral 10 is employed to indicate generally a pod or package of aerodynamic configuration which may form the external housing for the trailing refueling unit, which housing may be suspended from a fixed part 11 of the aircraft as by means of the pylon 11a, although it is understood that this installation may be made directly in the fuselage or body of the aircraft.

As suggested in Figure 2 of the drawing a pair of spaced trunnion bearings 12 may be supported by any rigid part of the package 10 of the aircraft and the aligned stub shafts 13 and 14 may be mounted therein. Rotatably carried upon the inner ends of the respective shafts 13 and 14 is the reel or drum 15 which comprises the cylindrical drum proper 16 and the end discs 17 and 18, these end discs being provided with hubs which fit around the inner ends of the shafts 13 and 14. The drum cylinder 16 may be secured to the end plates or discs 17 and 18 as by means of the weldings 19. The periphery of the end disc 18 is provided with worm gear teeth 20 which mesh with the worm 22 carried on the worm shaft 23 which is driven by a suitable source of power, for example, the motor 24, the mounting and functioning of which will be described presently. This motor is a reversible motor which is capable of driving the drum 15 in either direction, for either paying out the hose or reeling it in.

Adapted to be wound upon the drum 15 is the flexible hose 27, one end 28 of which is secured to a rotary joint or coupling 29 carried by the end of the pipe line 30 which passes through the hollow stub shaft 14 which together with the shaft 13 supports the reel. The pipe 30 is connected with the supply of the fuel or other liquid (not shown) to be transferred through the hose 27, and the hose passes through an opening in the drum cylinder 16 to lie in regular convolutions on the reel.

Straddling the reel and rotatably supported upon the stub shafts 13 and 14 is the yoke 35, the ends of the arms of the U-shaped yoke being provided with openings 36 through which the shafts extend. Rigidly secured to the bottom of the bight of the yoke 35 is the inner end of the tubular guide element 40, this tubular element 40 being preferably extended from the yoke 35 at the slight angle suggested in Figure 1 of the drawings and then provided with a gentle bend at its remote end as indicated at 41, the tubular member 40 terminating in a flared fairlead portion 42. The hose 27 extends from the reel into the tubular element 40 at its inner end and when streamed or trailed for refueling, it projects from the open fairlead portion 42 as clearly indicated in Figure 1. The hose carries at its remote end the combined drogue-and-coupling socket member indicated generally at 45, and the fairlead portion 42 at the end of the guide tube is conformed to the base or coupling portion 46 of the drogue-and-coupling member to form a socket therefor, the socketing being firmly established, as in the broken line position indicated at B in Figure 1, when the hose is wound in and placed under some slight tension. (A combined drogue and coupling socket acceptable for use in this connection is illustrated in the patent to Cobham et al. No. 2,692,102.) As is well known in this art, the coupling-drogue member is adapted to be contacted and engaged by the probe element of the following aircraft as suggested at 45a in the drawings.

Fixed to one of the arms of the yoke 35 and surrounding one of the stub shafts, as the one designated 13, is a pinion 48, the means for securing the pinion to the yoke being in this instance the screw 49. A larger gear 50 fixed to a shaft 51 which is rotatably carried in bearings (not shown) fixed to a stationary part of the pod or aircraft body meshes with the pinion 48. The shaft 51 has fixed to it a crank 52 to the end of which is pivoted a connecting rod or piston rod 53. The rod 53 passes into a power cylinder 55 and a piston 56 is carried within the cylinder upon the piston rod. Inlet and outlet connections 57 and 58 are provided for the cylinder whereby a power fluid may be applied upon either side of the piston 56 to rock the shaft 51 and rotate the gear 50 through an angle sufficient to swing the yoke 35 between the extreme positions indicated respectively at C and D. To accommodate the necessary swinging movement of the power cylinder 55 it may be pivotally mounted as at 59 upon a fixed portion of the pod 10.

It is understood that the hydraulic cylinder 55 constitutes only one possible method of operating the unit, other means being available such as a pneumatic cylinder, an electric motor, a simple spring, or the like.

The package or pod 10 is fitted with doors as suggested at 60 which are adapted to enclose the swinging guide tube 40 and the hose end carried thereby when it is stowed within the package as indicated in the broken line position C.

Reverting to the motor 24 which drives the reel 15, it will be noted that the motor is mounted on the yoke 35 by means of the bracket 25 carried by one of the arms of the yoke. This is so that the reel may turn with the yoke when the latter swings upon its trunnions, especially when the hose is fully reeled in and under tension sufficient to seat the drogue-and-coupling member firmly against the end 42 of the guide tube.

The operation of the device may be described as follows:

When required for use, hydraulic pressure is fed to the right-hand side of the piston 56 within the cylinder 55 which causes the piston to move to the left and, through the gearing 48 and 50, to lower the tube out of the pod 10 from the position C to a preliminary position which may be the one shown at B. The doors 60 may be arranged to cooperate with this movement by providing them with a hydraulic actuating cylinder 55' energized in conjunction with the main power cylinder 55, and operatively interconnected with the latter cylinder by any suitable form of common control such as suggested at 60' in Figure 1.

When the tube 40 has reached the primary operating position, the hose reel 15 is caused to rotate independently of the swinging tube assembly 35, 40, allowing the hose 27 to trail from the end 42 of the tube 40 under the influence of air drag on the drogue 45. Trailing is completed when all of the hose 27 has run off the hose reel, which is then arrested by a mechanical stop. The drag of the hose and drogue will then cause the guide tube 40 to assume a position approximately at B. The action just described may be provided for by the reversible motor 24 being attached to the tube and stirrup combination 35, 40 and driving the hose reel through the irreversible mechanism comprised by the worm and worm wheel 22, 18.

The receiver or following aircraft formates on the trailing drogue and makes contact in the conventional manner. Lateral and vertical movements by the receiver airplane are provided for by the flexibility of the trailing hose. Movements in the fore-and-aft direction are permitted by the tube 40 swinging about the axis of the hose reel 15 under the influence of the hydraulic cylinder 55 and its associated gearing, suitable pressure within the cylinder 55 being provided by either hydraulic means or a spring which tends to apply a force balancing the drag due to the exposed elements of tube 40, hose 27, and drogue 45. This force is arbitrarily placed at about 80% (in terms of torque at the center of the hose reel) of the combined air drag of the exposed elements. It will thus be seen that while the torque provided by the cylinder 55 is only a portion of the torque due to drag, it cannot be effective in swinging the tube in a forward direction until assisted by a contact by the receiver aircraft, which contact neutralizes the drag of the greatest of the three components which is the drogue. The influence of the motor-produced torque tends to swing the tube forwardly and the drag of the exposed elements provides the force necessary to keep the hose under controlled tension at all times. The trailed parts, therefore, during refueling operation, may vary in position from B to D depending on the relative positions of the aircraft.

Control of the supply of the fuel to the receiver airplane is effected by linking the angular motion of the tube 40 to a fuel valve in such a manner that the valve is progressively opened as the tube swing forwardly from its rearmost position, and vice versa, gradually cutting off the fuel supply as the tube moves backwardly toward the point at which the receiver aircraft disengages, which may well be in the vicinity of position B.

One very diagrammatic embodiment of these features is schematically set forth in Figure 2 of the drawings wherein the fuel conduit 30 and its extension 30a contains a cut-off valve 65 of any suitable type which will serve to cut off and restore flow of fuel from a tank indicated diagrammatically at 66 which is carried by the tanker aircraft. The conduit 30a may have any suitable breakaway connections in it as desired.

The movable valve element of the valve installation 65 is carried upon a shaft 67 which in turn is provided with a pinion 68 which meshes with the segment gear 70 which is rigid with one arm of the yoke 35. The segment 70 is preferably arranged so as to accommodate actuation of the valve 65 approximately during the movement of the tube 40 to and from its positions B and D.

After completion of the refueling operation, the hose 27 is left in the fully trailed condition and the motor driving the reel 15 independently of the tube 40, through the irreversible gearing, causes the hose to be fully wound on the hose reel to the point where the drogue and the coupling 45 socket firmly into the fairlead 42. At this point, the application of fluid to the left-hand side of the piston of the hydraulic cylinder 55 causes the tube to swing upwardly into its stowed position C, the tube assembly and the reel pivoting as one, due to the mounting of the reel driving motor and transmission upon the tube yoke 35. The doors 60 will of course be opened either at will or automatically simultaneously with the actuation of the power cylinder 55 to close about the stowed drogue-and-coupling member 45.

It will be understood that the invention has been illustrated herein in diagrammatic form, and also that the entire disclosure is of an exemplary nature only, and that various changes and modifications may be made in the embodiments described without departing from the scope of the invention as defined by the following claims.

Having thus described the invention, what is claimed as new and desired to be secured by Letters Patent is:

1. In a system for operatively coupling a following and a leading aircraft for the transfer of liquid material from a container in one aircraft to a container in the other as for the purpose of refueling; a substantially self-contained unit for attachment to the leading aircraft, which unit comprises, in combination, a pod of aerodynamic configuration, a hose reel rotatably mounted within said pod, a flexible hose supported upon said reel for winding upon and unwinding therefrom, means providing communication between one end of said hose and such container carried by said leading aircraft, a coupling element on the other end of said hose for attachment to cooperating coupling means carried by the following aircraft, means mounted within said pod and operatively connected to said reel for rotating the latter in either direction, for unwinding the hose therefrom for paying out the hose to permit it to trail from said pod under the influence of its drag in flight and for winding the hose thereon for reeling it in from such trailing position; an opening in said pod, and a closure for said opening, a rigid guide member adjustably carried by said pod so as to be projectable outwardly through said opening and retracted inwardly thereof at will, the portion of said hose extending beyond the reel being guided closely along said guide member and movable axially therealong upon rotation of the reel, whereby the liquid conducting system, comprised by the combined hose and guide member, extending from said pod is, in operation, inflexible adjacent said pod for the extent of the rigid guide member, but flexible and thus transversely yieldable in its trailing portion beyond such inflexible portion, means operatively connected with said guide member for projecting and retracting it, and means for appropriately opening and closing said closure.

2. In a system for operatively coupling a following and a leading aircraft for the transfer of liquid material from a container in one aircraft to a container in the other, as for the purpose of refueling; an installation carried by the leading aircraft which comprises, in combination, a hose reel rotatably supported upon the leading aircraft with its axis transverse to the line of flight, means carried by said leading aircraft and operatively connected with said reel for rotating it in either direction, a flexible hose carried by said reel in a position to be adapted to be wound upon and unwound from said reel so as to be reeled in from and paid out to a position to trail under the influence of its own drag in flight, rotary coupling means coaxial with said reel connecting one end of said hose with such container in said leading aircraft, a coupling element carried by the other end of said hose and adapted for connection with cooperating coupling means carried by the following aircraft, a rigid hose-guiding member pivoted at its inboard end to the leading aircraft at a point adjacent to said reel and on an axis coinciding with the axis of said reel and swingable in a substantially vertical fore-and-aft plane to a retracted position with respect to said leading aircraft and from such retracted position outwardly of the leading aircraft to approximately vertical positions for operation, said hose being movable substantially axially along and guided by said guiding member during reeling in and paying out thereof, all whereby said hose may be rigidly extended and supported for a limited distance, corresponding to the length of said guiding member, from the leading aircraft and allowed to trail freely from the outboard end of said guiding member when paid out.

3. In a system for operatively coupling a following and a leading aircraft for the transfer of liquid material from a container in one aircraft to a container in the other, as for the purpose of refueling; an installation carried by the leading aircraft which comprises, in combination, a hose reel rotatably supported upon the leading aircarft with its axis transverse to the line of flight, means carried by said leading aircraft and operatively connected with said reel for rotating it in either direction, a flexible hose carried by said reel in a position to be adapted to be wound upon and unwound from said reel so as to be reeled in from and paid out to a position to trail under the influence of its own drag in flight, rotary coupling means coaxial with said reel connecting one end of said hose with such container in said leading aircraft, a drogue-and-coupling member carried by the other end of said hose, the coupling portion of said last named member adapted for connection with cooperating coupling means carried by the following aircraft, a rigid hose-guiding member pivoted at its inboard end to the leading aircraft at a point adjacent to said reel and on an axis coinciding with the axis of said reel and swingable in a substantially vertical fore-and-aft plane to a retracted position with respect to said leading aircraft and from such retracted position outwardly of the leading aircraft to approximately vertical positions for operation, said hose being movable substantially axially along and guided by said guiding member during reeling in and paying out thereof, power means carried by said leading aircraft, means operatively connecting said power means with said guiding member for swinging the latter, reversible power means carried by said swingable hose guiding member in said leading aircraft, and means operatively connecting said second named power means with said reel to drive it in either direction, all whereby said hose may be rigidly extended and supported for a limited distance, corresponding to the length of said guiding member, from the leading aircraft and allowed to trail freely from the outboard end of said guiding member when paid out.

4. In a system for operatively coupling a following and a leading aircraft for the transfer of liquid material from a container in one aircraft to a container in the other, as for the purpose of refueling; an installation carried by the leading aircraft which comprises, in combination, a hose reel rotatably supported upon the leading aircraft with its axis transverse to the line of flight, a flexible hose carried by said reel in a position to be adapted to be wound upon and unwound from said reel so as to be reeled in from and paid out to a position to trail under the influence of its own drag in flight, rotary coupling means coaxial with said reel connecting one end of said hose with such container in said leading aircraft, a drogue-and-coupling member carried by the other end of said hose, the coupling portion of said last named member adapted for connection with cooperating coupling means carried by the following aircraft, a rigid hose-guiding member pivoted at its inboard end to the leading aircraft at a point adjacent to said reel and on an axis coinciding with the axis of said reel and swingable in a substantially vertical fore-and-aft plane to a retracted position with respect to the leading aircraft from such retracted position outwardly of said leading aircraft to approximately vertical positions for operation, said hose being movable substantially axially along and guided by said guiding member during reeling in and paying out thereof, power means carried by said leading aircraft, means operatively connecting said power means with said guiding member for yieldably swinging the latter, reversible power means carried by said swingable hose guiding member in leading aircraft, and means operatively connecting said second named power means with said reel to drive it in either direction, all whereby said hose may be rigidly extended and supported for a limited distance, corresponding to the length of said guiding member, from the leading aircraft and allowed to trail freely from the outboard end of said guiding member when paid out; the power means for controlling the extension and retraction of the guiding member being yielding and exerting a force so related to the combined drag of the fully exposed trailing guiding member and hose assembly that said force is always less than the torque of said drag at the axis of the hose reel, and thus is insufficient to swing said guiding member forwardly to fully operating position until assisted by contact by the following aircraft, whereby the trailing hose may be kept under controlled tension at all times.

5. In a system for operatively coupling a following and a leading aircraft for the transfer of liquid material from a container in one aircraft to a container in the other, as for the purpose of refueling; an installation carried by the leading aircraft which comprises, in combination, a hose reel rotatably supported upon the leading aircraft with its axis transverse to the line of flight, a flexible hose carried by said reel in a position to be adapted to be wound upon and unwound from said reel so as to be reeled in from and paid out to a position to trail under the influence of its own drag in flight, rotary coupling means coaxial with said reel connecting one end of said hose with such container in said leading aircraft, a drogue-and-coupling member carried by the other end of said hose, the coupling portion of said member adapted for connection with cooperating coupling means carried by the following aircraft, a rigid hose-guiding member pivoted at its inboard end to the leading aircraft at a point adjacent to said reel and on an axis coinciding with the axis of said reel and swingable in a substantially vertical fore-and-aft plane to a retracted position with respect to the leading aircraft and from such retracted position outwardly of the leading aircraft to approximately vertical positions for operation, said hose being movable substantially axially along and guided by said guiding member during reeling in and paying out thereof; power means carried by said leading aircraft, means operatively connecting said power means with said guiding member for yieldably swinging the latter, reversible power means carried by said swingable hose guiding member in said leading aircraft, and means, operatively connecting said second named power means with said reel to drive it in either direction, all whereby said hose may be rigidly extended and supported for a limited distance, corresponding to the length of said guiding member, from the leading aircraft and allowed to trail freely from the outboard end of said guiding member when paid out; the power means for controlling the extension and retraction of the guiding member being yielding and exerting a force so related to the combined drag of the fully exposed trailing guiding member and hose assembly that said force is always less than the torque of said drag at the axis of the hose reel, and thus is insufficient to swing said guiding member forwardly to fully operating position until assisted by contact by the following aircraft, whereby the trailing hose may be kept under controlled tension at all times; valve means for controlling flow of fluid through said hose, means operatively connecting said valve means with said swinging hose guiding member for closing said valve and preventing flow when the guiding member is in its rearmost exposed position and permitting flow only when said swinging guiding member is swung forwardly from said rear position as by relief of drag by contact of the following aircraft.

6. In a system for operatively coupling a following and a leading aircraft for the transfer of liquid material from a container in one aircraft to a container in the other, as for the purpose of refueling; and installation carried by the leading aircraft which comprises, in combination, a hose reel rotatably supported upon the leading aircraft with its axis transverse to the line of flight, a flexible hose carried by said reel in a position to be adapted to be wound upon and unwound from said reel so as to be reeled in from and paid out to a position to trail under the influence of its own drag in flight, rotary coupling means coaxial with said reel connecting one end of said hose with such container in said leading aircraft, a drogue-and-coupling member carried by the other end of said hose, the coupling portion of said member adapted for connection with cooperating coupling means carried by the following aircraft, a rigid hose-guiding member pivoted at its inboard end to the leading aircraft at a point adjacent to said reel and on an axis coinciding with the axis of said reel and swingable in a substantially vertical fore-and-aft plane to a retracted position with respect to the leading aircraft and from such retracted position outwardly of the leading aircraft to approximately vertical positions for operation, said hose being movable substantially axially along and guided by said guiding member during reeling in and paying out thereof; power means carried by said leading aircraft, means operatively connecting said power means with said guiding member for yieldably swinging the latter, reversible power means carried by said swingable hose guiding member in said leading aircraft, and means operatively connecting said second named power means with said reel to drive it in either direction, all whereby said hose may be rigidly extended and supported for a limited distance, corresponding to the length of said guiding member, from the leading aircraft and allowed to trail freely from the outboard end of said guiding member when paid out; valve means for controlling flow of fluid through said hose, means operatively connecting said valve means with said swinging hose guiding member for closing said valve and preventing flow when the guiding member is in its rearmost exposed position and permitting flow only when said swinging guiding member is swung forwardly from said rear position as by relief of drag by contact of the following aircraft.

References Cited in the file of this patent

UNITED STATES PATENTS

| | | |
|---|---|---|
| 1,848,372 | Moran | Mar. 8, 1932 |
| 2,043,262 | Oglesby et al. | June 9, 1936 |
| 2,138,970 | Jones | Dec. 6, 1938 |
| 2,388,013 | Rasor | Oct. 30, 1945 |
| 2,443,276 | Seevers | June 15, 1948 |
| 2,596,455 | Williams | May 13, 1952 |
| 2,692,102 | Cobham et al. | Oct. 13, 1954 |

OTHER REFERENCES

"Flight," vol. LXII, issue 2284, page 567, October 31, 1952.